Jan. 17, 1961

B. MAHLER ET AL 2,968,423

ADJUSTABLE POURING SPOUT

Filed Oct. 30, 1959

INVENTORS
BENJAMIN MAHLER
JOSEPH POWAZI

BY

ATTORNEY.

ary to the accom-  
panying drawing, wherein:

2,968,423
ADJUSTABLE POURING SPOUT

Benjamin Mahler, Roosevelt, and Joseph Powazi, Ridgewood, N.Y., assignors to Marveleye Plastics, Inc., New York, N.Y., a corporation of New York Filed Oct. 30, 1959, Ser. No. 849,847

4 Claims. (Cl. 222—49)

This invention relates to dispensing apparatus and, more particularly, to apparatus for dispensing fluids.

It is an object of the present invention to provide a combined closure member and dispensing device for fluid storage containers, that will automatically dispense a predetermined quantity of material during the pouring thereof from the storage container.

Another object of the present invention is to provide an adjustable pouring spout which can be detachably mounted upon any liquid storage container and which is adjustable from the exterior thereof to pour a selected quantity of material during each pouring operation thereof.

An additional object of the present invention is to provide a combined bottle stopper and adjustable pouring spout of the type described which may be permanently sealed to the storage container to block access to the interior thereof, so as to allow for the emptying of the contents therefrom and preventing the refilling of such container.

A more specific object of the present invention is to provide a sanitary closure member for liquid storage containers which has a pouring spout through which a predetermined quantity of liquid may be dispensed, and in which such quantity may be adjustably controlled from the exterior of the assembly to prevent contamination of the contents in any way, and to provide for the controlled dispensing of the contents therefrom.

All of the foregoing and still further objects and advantages of this invention will become apparent from a study of the following specification, taken with the accompanying drawing, wherein.

Figure 1:
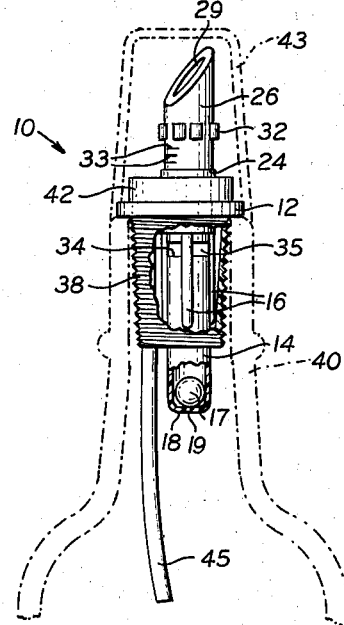
Fig. 1 is a side elevational view, with parts broken away, of a combined stopper and pouring spout made in accordance with the present invention.
Figure 2:
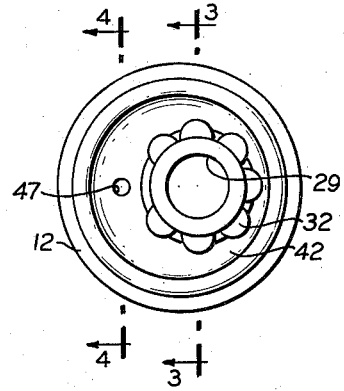
Fig. 2 is a top plan view of the assembly shown in Fig. 1.
Figure 4:
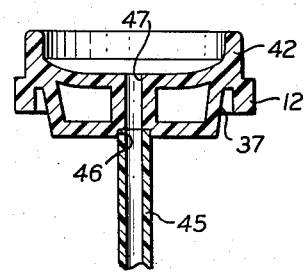
Fig. 4 is an enlarged longitudinal cross-sectional view taken along line 4—4 of Fig. 2.
Figure 3:
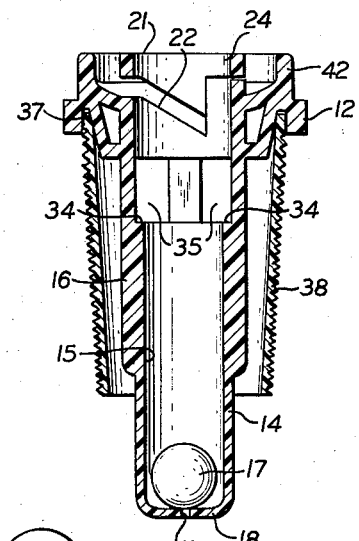
Fig. 3 is an enlarged longitudinal cross-sectional view taken along line 3—3 of Fig. 2, with the duct piece forming a part of the present invention removed therefrom.
Figure 5:
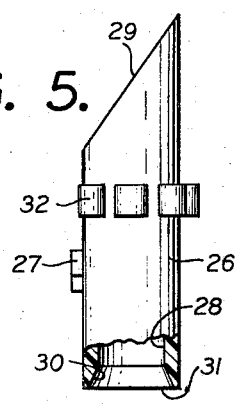
Fig. 5 is an enlarged side elevational view, with parts broken away, of the duct piece forming a part of the present invention.
Figure 6:
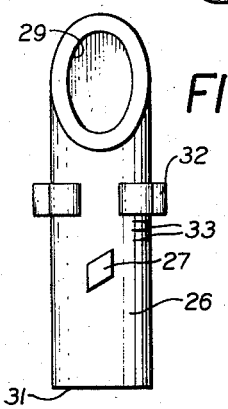
Fig. 6 is a side view of the duct piece shown in Fig. 5.

Referring now to the drawing, and more particularly to Figs. 1 to 3 thereof, a combined closure member and adjustable pouring spout 10 made in accordance with the present invention is shown to include a formed base member 12 having a housing 14 depending from one inner side thereof. This housing 14 has an interior duct or an end wall 18 and which opens outwardly through the outer side of the base 12. The central portion of the housing 14 is reinforced by ribs 16 which are also integral with the inner side of the base 12.

A ball detent member 17 of slightly smaller diameter than the inside diameter of the passageway 15 of the housing 14 is movable by gravity during the tilting of the container between a normally lowered position at rest against the innermost end wall 18 of the housing 14 and an adjusted position along the length of the passageway 15 toward the open end of the housing. The end wall 18 is provided with a vent 19 which allows fluid that accumulates within the interior of the passageway 15 to be emptied from the passageway 15 upon the return of the ball 17 to its normal lowered position.

The open end 21 of the housing 14 defines a spiral cam slot 22 with complementary portions of an associated annular member 24, which may, if desired, be integral with the housing 14. This cam slot 22 slidably receives a follower 27 carried by one side of a tubular duct piece 26 that is rotatably and axially adjustably supported within the passageway 15 of the housing 14. The duct piece 26 is also provided with a longitudinal bore 28 which opens outwardly toward an outlet 29 at one outer end of the duct piece and which communicates with the interior of the housing 14 through a valve seat 30 at its innermost end. The valve seat 30 is flared outwardly to sealingly receive the ball detent member 17 in response to movement thereof from its normal rest position against the end wall 18 of the housing 14 and its adjusted position in closing engagement with the valve seat 30.

The exterior of the duct piece 26 adjacent to the outer side of the closure portion of the base 12, is provided with radial protuberances 32 which may be manually grasped for rotating the duct piece 26 with respect to the base member 12. During such rotation of the duct piece 26, it is adjusted axially with respect to the length of the housing 14, thus adjusting the size of a plurality of fluid outlet ports 35 through the wall of the housing 14 and the distance between the end wall 18 of the housing 14 and the valve seat 30 of the duct piece 26. The effect of this adjustment is to vary the volume of liquid allowed to pass into the duct piece during the time it takes the ball detent member 17 to travel into closing engagement with the duct piece 26, for purpose hereinafter more fully described. Visual graduations 33 upon the exterior of the duct piece 26 may be used as guides for setting the mechanism according to predetermined standards.

The inner side of the base closure member 12 is also provided with an annular groove 37 within which the upper end of a resilient sleeve 38 is secured. This sleeve 38 is inserted into the neck 40 of a fluid storage vessel, such as a bottle, so as to provide a seal between the inner and outer working parts of the assembly. The outer side of the base closure member 12 is provided with an annular mounting boss 42 upon which a closure cap 43 may be detachably mounted to protect the outlet 29 of the duct piece 26 from the entry of foreign particles and contaminating material. The cap 43 may be of the type which is frictionally engageable upon the boss 42 so as to be usable throughout the useful life of the assembly.

The inner side of the base closure member 12 is also provided with a socket 46 within which one end of a flexible vent tube 45 may be secured, such vent tube 45 serving to vent the interior of the container 40 to atmosphere through a port 47 in the base member 12 during the pouring of the contents outwardly therefrom through the duct piece 26.

In actual use, the entire assembly 10 may be permanently or removably sealed within the opening of the fluid storage container. As soon as the container is tilted toward a pouring position, the ball detent 17 will commence its movement toward its seated position with the valve seat 30 of the duct piece 26. However, before the ball detent member 17 can close with the valve seat 30, a certain amount of the fluid within the receptacle will have been allowed to escape outwardly through the ports 35 and the communicating longitudinal bore 28 of the duct piece 26. When the duct piece 26 is in its outermost position, as determined by the outer limit of the cam slot 22, the fluid outlet ports will allow maximum flow of liquid through the duct piece during the travel of the ball detent 17 from its normal at rest position against the end wall 18 of the housing 14 to its adjusted position in closing engagement with the valve seat 30, thus allowing for the dispensing of a maximum amount of fluid. However, by rotating the duct piece 26 through the protuberances 32 and guided by the markings 43, the distance between the ball detent 17 and the valve seat 30 may be reduced, as well as the size of the fluid outlet ports 35, to thus reduce the amount of fluid allowed to pass outwardly through the outlet 29 of the duct piece during any one dispensing operation. The relative lengths of the parts are also such that the inner end 31 of the duct piece will be brought into closing engagement with an annular shoulder 25 beneath the outlet ports 35 when the duct piece 26 is rotated to its fully closed position. In this position, communication between the interior of the container and the duct piece is shut off and the contents of the container 40 are protected against contamination, evaporation, and loss during handling.

It will now be appreciated that this type of assembly is especially useful for many types of liquid and gaseous materials in which it is desired to control the quantity of such materials dispensed during each dispensing operation thereof. Since the ball detent 17 is gravity operated, the quantity of fluid dispensed during each dispensing operation is thus a function of the size of the openings through the ports 35 and the time required for the ball detent 17 to move through the distance between the end wall 18 and the facing valve seat 30. When used for dispensing alcoholic beverages, the assembly may be permanently sealed within a container so as to make the refilling thereof extremely impractical, so as to guard against dilution, avoidance of taxes, and the like. It will also be recognized that the scale 33 may be provided with any desired indicia to indicate the quantity of the material to be dispensed, for example, ounces for certain materials, jiggers for other materials, and cups and fractions of cups for still other types of material.

While this invention has been described with particular reference to the construction shown in the drawing, it is to be understood that such is not to be construed as imparting limitations upon the invention which is best defined by the claims appended hereto.

Having thus described our invention, what we claim as new and desire to secure by Letters Patent is:

1. A dispensing device for fluids comprising, in combination, a duct piece, mounting means for supporting one inlet end of said duct piece within the interior of a fluid storage container with the opposite outlet end thereof projecting outwardly therefrom, valve means carried by said mounting means and said duct piece controlling the flow of fluid outwardly through said duct piece from said inlet end to said outlet end thereof, and manual adjustment means for said valve means accessible from the exterior of said container for varying the quantity of fluid flow through said duct piece, said mounting means comprising a closure having one inner side facing toward said inlet end of said duct piece and an opposite outer side facing toward said outlet end of said duct piece, a housing depending from said inner side of said closure and opening outwardly through said outer side of said closure, said duct piece being mounted within said housing and projecting outwardly through said outer side of said closure, and ports in said housing providing communication between said duct piece and the interior of the container, said housing being closed at one end spaced from said closure, said ports in said housing extending through said housing adjacent to said inner side of said closure, said opposite end of said duct piece defining a valve seat facing toward said closed end of said housing, and said valve means comprising a detent within said housing movable between said closed end of said housing and said valve seat, said manual adjustment means comprising guide means acting between said duct piece and said mounting means controlling the size of said ports and the distance between said valve seat and said closed end of said housing, said guide means comprising a cam and follower each mounted upon one of said duct piece and said housing members, said cam and follower effecting relative longitudinal movement between said duct piece and said ports in said housing in response to rotation of said duct piece to control the size of the opening therethrough.

2. A dispensing device as set forth in claim 1, further comprising scale means indicating the relative positions of said duct piece and said housing to determine the quantity of fluid to be dispensed through said outlet.

3. A dispensing device as set forth in claim 2, further comprising an air vent communicating with said inner and outer sides of said closure.

4. A dispensing device as set forth in claim 3, wherein said detent comprises a weighted spherical ball member.

References Cited in the file of this patent
UNITED STATES PATENTS

| | | |
|---|---|---|
| 2,141,871 | Koukal | Dec. 27, 1938 |
| 2,168,050 | Slipikas | Aug. 1, 1939 |
| 2,425,313 | Hammerstein | Aug. 12, 1947 |
| 2,645,388 | Hester | July 14, 1953 |